(12) United States Patent
Asati et al.

(10) Patent No.: US 9,246,809 B2
(45) Date of Patent: Jan. 26, 2016

(54) DYNAMIC DISCOVERY OF IPV6 TRANSITION PARAMETERS BY BORDER/RELAY ROUTERS

(75) Inventors: Rajiv Asati, Morrisville, NC (US); Wojciech Dec, Amsterdam (NL); Daniel G. Wing, San Jose, CA (US); Ralph Droms, Concord, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 115 days.

(21) Appl. No.: 13/489,800

(22) Filed: Jun. 6, 2012

(65) Prior Publication Data
US 2013/0329750 A1    Dec. 12, 2013

(51) Int. Cl.
| H04L 12/56 | (2006.01) |
| H04L 12/64 | (2006.01) |
| H04L 12/715 | (2013.01) |
| H04L 29/12 | (2006.01) |

(52) U.S. Cl.
CPC .......... *H04L 45/741* (2013.01); *H04L 12/6418* (2013.01); *H04L 45/04* (2013.01); *H04L 61/106* (2013.01); *H04L 61/251* (2013.01)

(58) Field of Classification Search
CPC ................ H04L 12/66; H04L 2012/46; H04L 29/06068; H04L 29/06095; H04L 29/12971; H04L 61/6086; H04L 45/741
See application file for complete search history.

(56) References Cited

U.S. PATENT DOCUMENTS

| 7,411,915 | B1 | 8/2008 | Spain et al. |
| 7,701,938 | B1 | 4/2010 | Bernstein et al. |
| 7,903,647 | B2 | 3/2011 | Kanekar et al. |
| 7,941,512 | B2 | 5/2011 | Droms et al. |
| 7,953,089 | B1 | 5/2011 | Ramakrishnan et al. |
| 8,458,302 | B2 | 6/2013 | Pang et al. |
| 8,625,603 | B1 | 1/2014 | Ramakrishnan et al. |
| 2006/0133390 | A1* | 6/2006 | Sreekantiah et al. ......... 370/401 |
| 2007/0276905 | A1* | 11/2007 | Durand et al. ................ 709/203 |
| 2009/0063357 | A1* | 3/2009 | Munger et al. .................. 705/80 |
| 2010/0172302 | A1* | 7/2010 | Dunk ............................ 370/328 |
| 2011/0106947 | A1* | 5/2011 | Lin ............................... 709/225 |
| 2011/0208845 | A1 | 8/2011 | Droms et al. |
| 2013/0078985 | A1* | 3/2013 | Savolainen et al. ........... 455/418 |
| 2013/0238770 | A1* | 9/2013 | Hajduczenia ................. 709/220 |

OTHER PUBLICATIONS

"Implementing Tunneling for IPv6", Cisco Systems, Inc., San Jose, Calif., May 5, 2008, 28 pages.

(Continued)

*Primary Examiner* — Alpus H Hsu
*Assistant Examiner* — Walter Divito
(74) *Attorney, Agent, or Firm* — Parker Ibrahim & Berg LLC; James M. Behmke; Kenneth J. Heywood

(57) ABSTRACT

In one embodiment, an edge router of a local computer network snoops client-server protocol configuration information of a customer-premises equipment (CPE) device. From the snooping, the edge router may identify an Internet Protocol version 6 (IPv6) transition option in place at the CPE device along with associated configuration parameters for the IPv6 transition option. As such, the edge router may then advertise the IPv6 transition option along with associated configuration parameters to one or more border/relay routers of the local computer network to cause the one or more border/relay routers to provision themselves with the IPv6 transition option and associated configuration parameters.

20 Claims, 7 Drawing Sheets

(56) References Cited

OTHER PUBLICATIONS

Despres, R., "IPv6 Rapid Deployment on IPv4 Infrastructures (6rd)", Request for Comments 5569, Internet Engineering Task Force, Jan. 2010, 11 pages.

Lindem, et al., "Extensions to OSPF for Advertising Optional Router Capabilities", The Internet Engineering Task Force, Network Working Group, Request for Comments 4970, Jul. 2007, 14 pages.

Townsley, et al., "IPv6 Rapid Deployment on IPv4 Infrastructures (6rd)—Protocol Specification", Request for Comments 5969, Internet Engineering Task Force, Aug. 2010, 19 pages.

Vasseur, et al., "Intermediate System to Intermediate System (IS-IS) Extensions for Advertising Router Information", The Internet Engineering Task Force, Network Working Group, Request for Comments 4971, Jul. 2007, 10 pages.

* cited by examiner

DYNAMIC DISCOVERY OF IPV6 TRANSITION PARAMETERS BY BORDER/RELAY ROUTERS

TECHNICAL FIELD

The present disclosure relates generally to computer networks, and, more particularly, to transitions between Internet Protocol version 4 (IPv4) and version 6 (IPv6) networks.

BACKGROUND

Increasingly, network operators offer IPv6 and IPv4 data services to their (external or internal) subscribers by not only using a dual-stack network, but also by using tunneling or translation (or both) through their v4 or v6 or dual-stack networks. In addition, tunneling or translation options are increasingly being used as "IPv6 Transition" or "IPv4 Address Exhaust" options, such as, for example:

1. IPv6 Rapid Deployment or "6rd" (6over4 tunnel mode);
2. IPv4 Residual Deployment encapsulation or "4rd-e" (4over6 tunnel mode);
3. Dual stateless IPv4/IPv6 translation or "dIVI" (4via6 translation mode);
4. Lightweight address family transition for IPv6 or "laft6" (4via6 translation mode); and
5. 4rd translation or "4rd-t" (4via6 translation mode).

Generally, all of the above IPv6 transition options require a set of related configuration parameters at the customer-premises equipment (CPE, also customer-provided equipment) as well as border/relay routers. For example, 6rd builds a stateless tunnel between the CPE and the border/relay router, and requires information such as 6rd domain, IPv4-address-to-IPv6-address mapping on the CPE as well as the border/relay routers. As another example, dIVI and 4rd require information such as 4rd domain, IPv6 prefixes, IPv4 address, sharing ratio, suffix, etc. on the CPE and border/relay routers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an edge router of a local computer network snoops client-server protocol configuration information of a customer-premises equipment (CPE) device. From the snooping, the edge router may identify an Internet Protocol version 6 (IPv6) transition option in place at the CPE device along with associated configuration parameters for the IPv6 transition option. As such, the edge router may then advertise the IPv6 transition option along with associated configuration parameters to one or more border/relay routers of the local computer network to cause the one or more border/relay routers to provision themselves with the IPv6 transition option and associated configuration parameters.

According to one or more additional embodiments of the disclosure, a border/relay router of a local computer network may receive an advertisement, from an edge router of the local computer network, identifying an IPv6 transition option and associated configuration parameters in place at a CPE device interconnected with the edge router. As noted, the border/relay router may then provision itself with the IPv6 transition option and associated configuration parameters based on the received advertisement.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Figure 1:
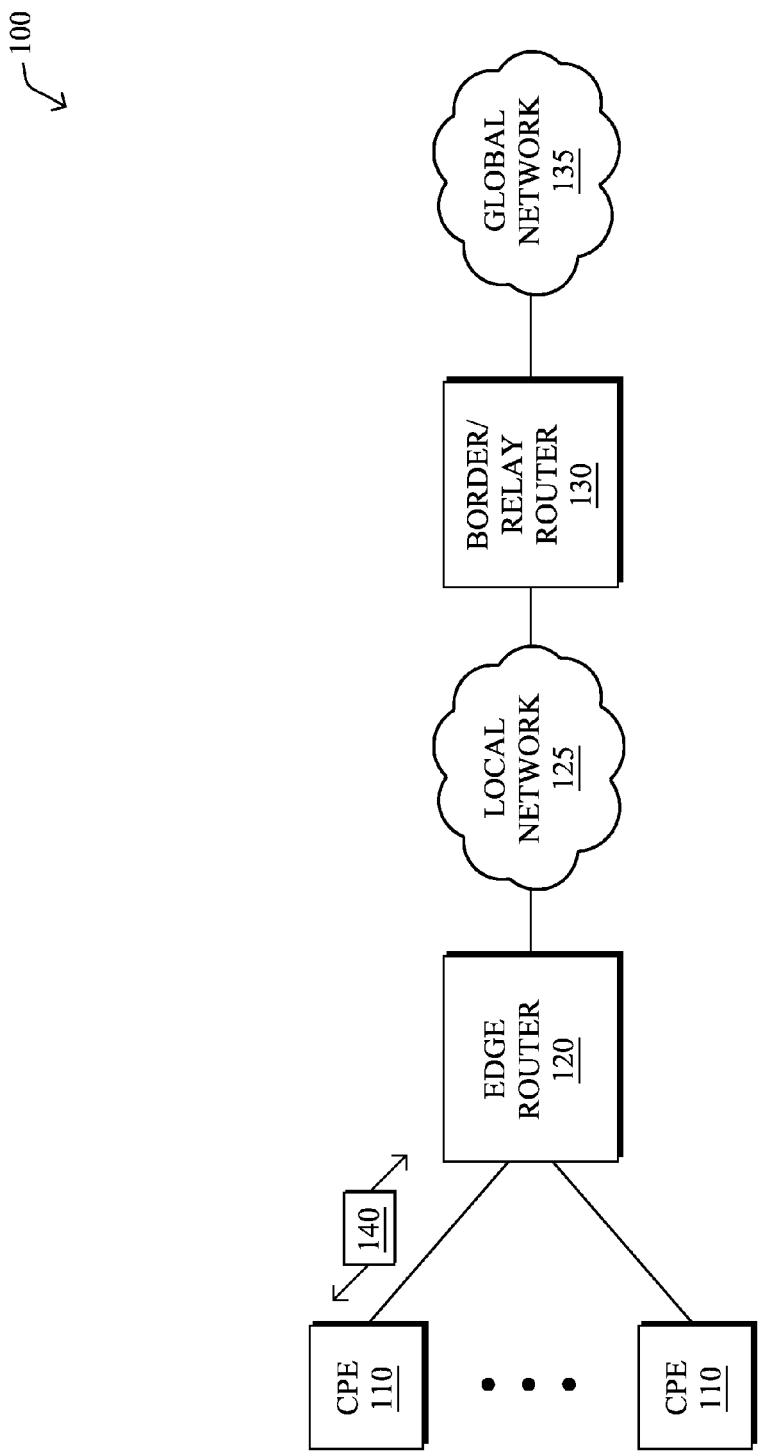
FIG. 1 illustrates an example communication network.

FIG. 1 is a schematic block diagram of an example computer network 100 illustratively comprising nodes/devices 200, such as customer-premises equipment (CPEs) 110 (e.g., cable modems, wireless routers, etc.), edge routers 120 (e.g., devices transitioning between local customer and/or provider networks 125), and border/relay routers 130 (e.g., devices interconnecting disparate networks with a global network 135), interconnected by various methods of communication. For instance, the links may be wired links or shared media, and may be used to establish and/or communicate with local networks 125 (e.g., LANs) and/or global networks 135 (e.g., WANs or the Internet). Those skilled in the art will understand that any number of nodes, devices, links, etc. may be used in the computer network, and that the view shown herein is for simplicity. Also, those skilled in the art will further understand that while the network is shown using a certain device naming convention, the network 100 and the device names are merely an example illustration that is not meant to limit the disclosure.

Data packets (or frames) 140 may be exchanged among the nodes/devices of the computer network 100 using predefined network communication protocols such as certain known wired protocols, wireless protocols, or other protocols where appropriate. In this context, a protocol consists of a set of rules defining how the nodes interact with each other.

Figure 2:
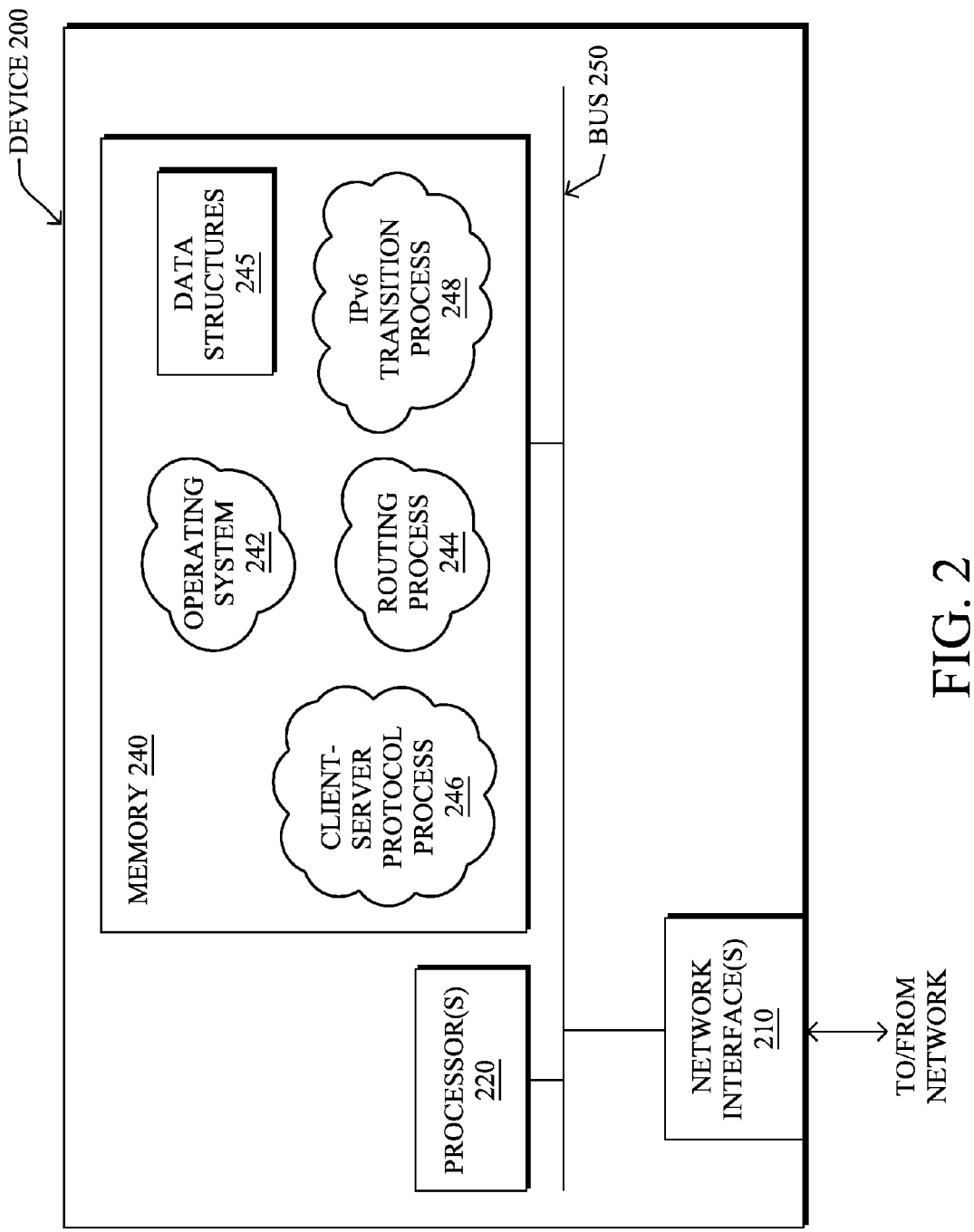
FIG. 2 illustrates an example network device/node.

FIG. 2 is a schematic block diagram of an example node/device 200 that may be used with one or more embodiments described herein, e.g., as any of the devices shown in FIG. 1 above, particularly edge routers 120 and border/relay routers 130 as described herein. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over links coupled to the network 100. The network interfaces may be configured to transmit and/or receive data using one or more communication protocols. Note, further, that the devices may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or logic elements adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process 244, client-server protocol process 246 (on edge routers 120), and an illustrative IPv6 transition process 248, as described herein. Note that while the processes are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes (e.g., IPv6 transition process 248 may be a component of one or both of routing process 244 and client-server protocol process 246).

Routing process 244 comprises computer executable instructions executed by the processor 220 to perform functions provided by one or more routing protocols, such as in accordance with IPv4 and/or IPv6 routing protocols (e.g., proactive or reactive) as will be understood by those skilled in the art. These functions may, on capable devices, be configured to manage a routing/forwarding table (a data structure 245) containing, e.g., data used to make routing/forwarding decisions. For example, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR), also referred to as Interior (or Internal) Gateway Protocols (IGPs), as well as the known Border Gateway Protocol (BGP).

Figure 3A:
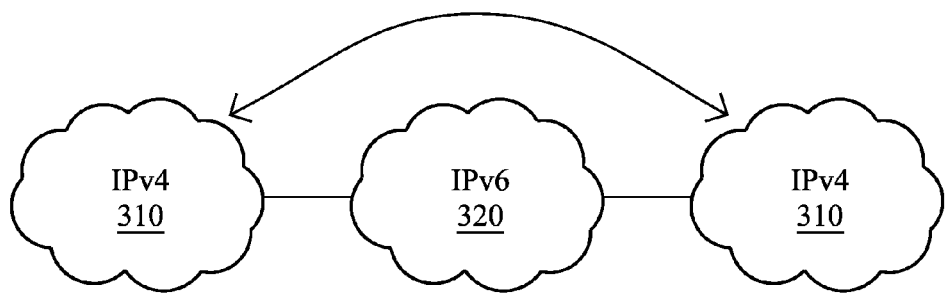
FIGS. 3A-3B illustrate examples of IPv6 transitions.
Figure 3B:
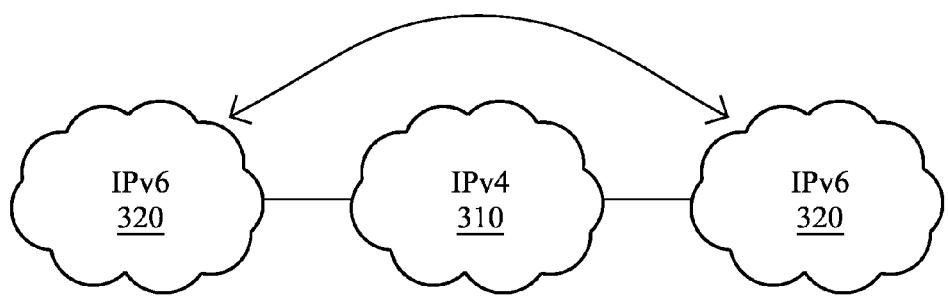

As noted above, IPv6 transition options (or IPv4 Address Exhaust options) such as tunneling or translation options are increasingly being used, such as 6rd, 4rd-e, dIVI, laft6, 4rd-t, etc., as may be appreciated by those skilled in the art. For example, FIGS. 3A-3B illustrate simplified examples of IPv6 transition generally, where in FIG. 3A two IPv4 networks 310 communicate over an IPv6 network 320, while FIG. 3B illustrates two IPv6 networks 320 separated by an IPv4 network 310. As such, a selected one of the above-mentioned IPv6 transition options may be used to tunnel over the intermediate network, or else translate between the different networks, accordingly.

As also noted above, all of the above-mentioned IPv6 transition options require a set of related configuration parameters at the customer-premises equipment (CPE) as well as border/relay routers. For example, 6rd builds a stateless tunnel between the CPE and the border/relay router, and requires information such as 6rd domain, IPv4-address-to-IPv6-address mapping on the CPE as well as the border/relay routers. As another example, dIVI and 4rd require information such as 4rd domain, IPv6 prefixes, IPv4 address, sharing ratio, suffix, etc. on the CPE and border/relay routers.

Currently, the related configuration information has been dynamically conveyed among CPEs. Accordingly, client-server protocols such as the dynamic host configuration protocol (DHCP) have been (or have been proposed to be) extended to convey the IPv6 transition option related information to CPEs, such as through client-server protocol process 246 on edge routers 120 (e.g., acting as a DHCP relay). However, border/relay routers (in the ISP network) still need to be pre-provisioned to make each of the above options work successfully. While some of the information may stay static, other information may change. Particularly, with a stateless NAT64 solution (network address translation between IPv6 and IPv4) such as 4rd/dIVI, it is highly likely that an operator may change the (IPv4) sharing-ratio, depending on a changing need to share the IPv4 address more or less over time.

In general, configuration of the border/relay routers has been manual, which given the fact that there are often tens- or hundreds-of-thousands of customers to provision, does not scale and is error-prone. Conversely, other current techniques provide for an out-of-band provisioning tool, such as using a network management server (NMS) to provision the corresponding edge router and every boundary router each time an end-customer is provisioned for a shared IPv4 address. This, however, contradicts the typical service provider (SP) provisioning policy of not having to configure the network on a per-customer basis. Moreover, it would require seamless interaction with the DHCP server, such as when the sharing ratio (or other parameter) may be changed (since it could be encoded in the IPv6 address itself). As such, router configuration has usually been performed via separate configuration servers or configuration templates that typically stay static.

The techniques herein, therefore, enable the border/relay routers to dynamically learn the necessary configuration information using a routing protocol (e.g., BGP) and to provision itself for the specified IPv6 transition option (e.g., dIVI/6rd/4rd/etc.), upon CPE provisioning, such as only when the CPE dynamically obtains the configuration information to provision itself (e.g., using a client-server protocol such as DHCP). As described herein, the techniques leverage intelligent network capabilities, and alleviate NMS dependency or error-prone operational practices (e.g., manual configuration), and illustratively without CPE-Relay interaction.

Specifically, according to one or more embodiments of the disclosure as described in detail below, an edge router 120 of a local computer network 125 "snoops" client-server protocol configuration information of a CPE device 110 (e.g., intercepting messages passing through the edge router, and examining them to acquire the desired information). From the snooping, the edge router may identify an IPv6 transition option in place at the CPE device along with associated configuration parameters for the IPv6 transition option. As such, the edge router may then advertise the IPv6 transition option along with associated configuration parameters to one or more border/relay routers 130 of the local computer network to cause the one or more border/relay routers to provision themselves with the IPv6 transition option and associated configuration parameters.

Illustratively, the techniques described herein may be performed by hardware, software, and/or firmware, such as in accordance with the IPv6 transition process 248, which may comprise computer executable instructions executed by the processor 220 (or independent processor of interfaces 210) to perform functions relating to the techniques described herein, e.g., in conjunction with routing process 244. For example, the techniques herein may be treated as extensions to conventional routing protocols, such as the various IGP and/or BGP protocols, and as such, may be processed by similar components understood in the art that execute those protocols, accordingly.

Operationally, the techniques herein automatically provision the border/relay routers 130 (which are currently manually configured) for any of the IPv6 transition options involving tunneling or translation as mentioned above. In particular, the techniques herein rely on collaboration between a client-server protocol (e.g., DHCP) and router-router protocol (e.g., a routing protocol) as described hereinafter.

According to the techniques herein, the client-server protocol (e.g., DHCP) is leveraged such that the edge router 120 (e.g., a provider edge or "PE" router), which may act as the client-server protocol server or else as a server relay (e.g., a DHCP relay), is configured to snoop the client-server exchange to determine client-server protocol configuration information of a CPE device 110.

Figure 4:
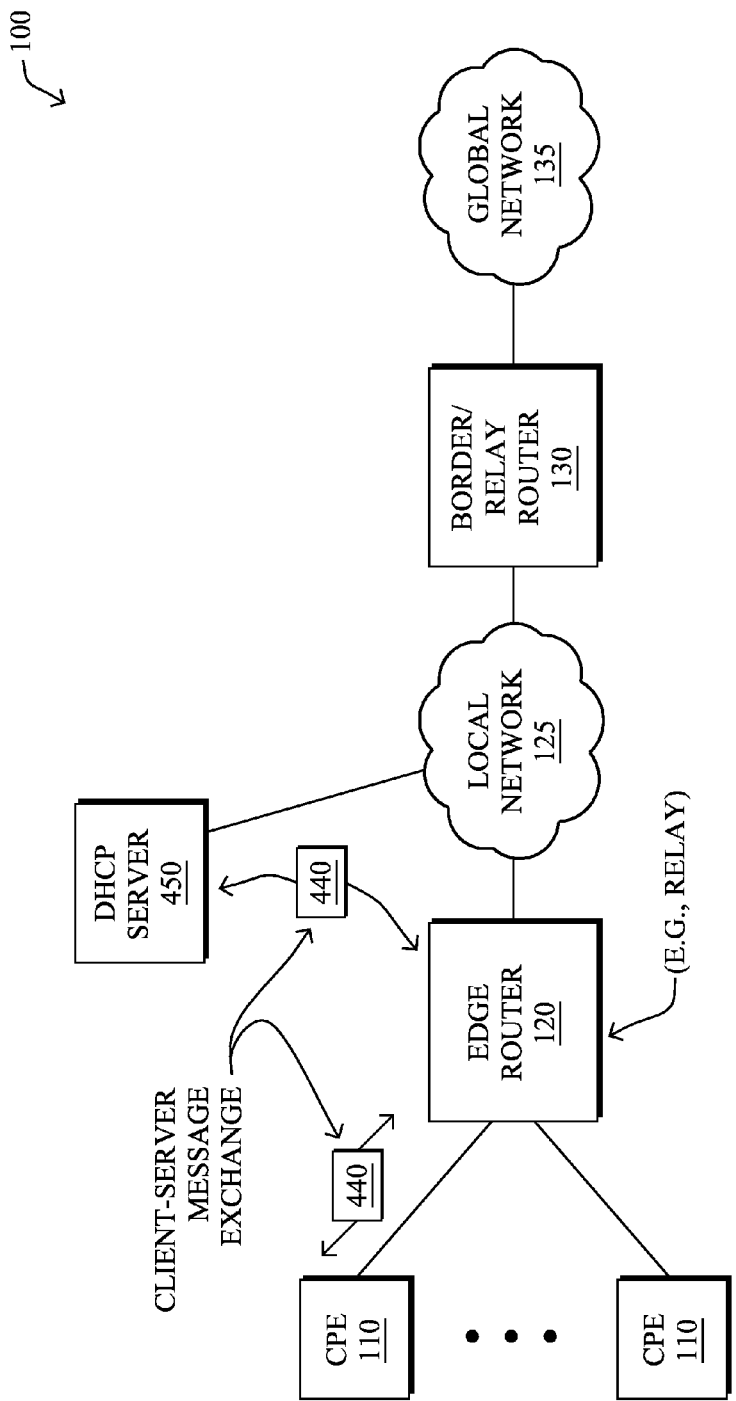
FIG. 4 illustrates an example client-server protocol exchange.

FIG. 4 illustrates a simplified client-server message exchange, where the CPE device (client) 110 exchanges messages 440 through the edge router 120 (server or relay), optionally to a separate server 450 (e.g., a DHCP server). The snooping, in general, is based on responses from the server back to the client (e.g., DHCP responses, such as within a DHCP Prefix Delegation or "DHCP-PD" option), where the edge router 120 installs corresponding routes in its routing table as usual. Additionally, however, according to the techniques herein, the edge router 120 also stores the configuration from other client-server options (e.g., DHCP options) in a local repository (e.g., data structure 245) for use as described below.

From this information, the edge router 120 may identify which IPv6 transition option is in place at the CPE device 110 by parsing the snooped information, as well as the set of configuration parameters needed for that particular option in order to then construct a routing protocol update message to advertise this information (non-redundantly) towards the border/relay routers 130. In particular, the edge router may sort out the stored information/parameters (e.g., all IP addresses pertaining to a single 6rd domain, all IPv6 addresses sharing the IPv4 address, etc.), and may prevent storage (or propagation) of redundant information, i.e., generating a routing protocol advertisement for the option only if it wasn't advertised before based on checking its local repository. As an example, there could be hundreds of CPEs using the same parameters for a particular transition option behind the edge router 120, but the edge router would generate only one advertisement (thus avoiding messaging storms and providing greater scalability).

Figure 5:
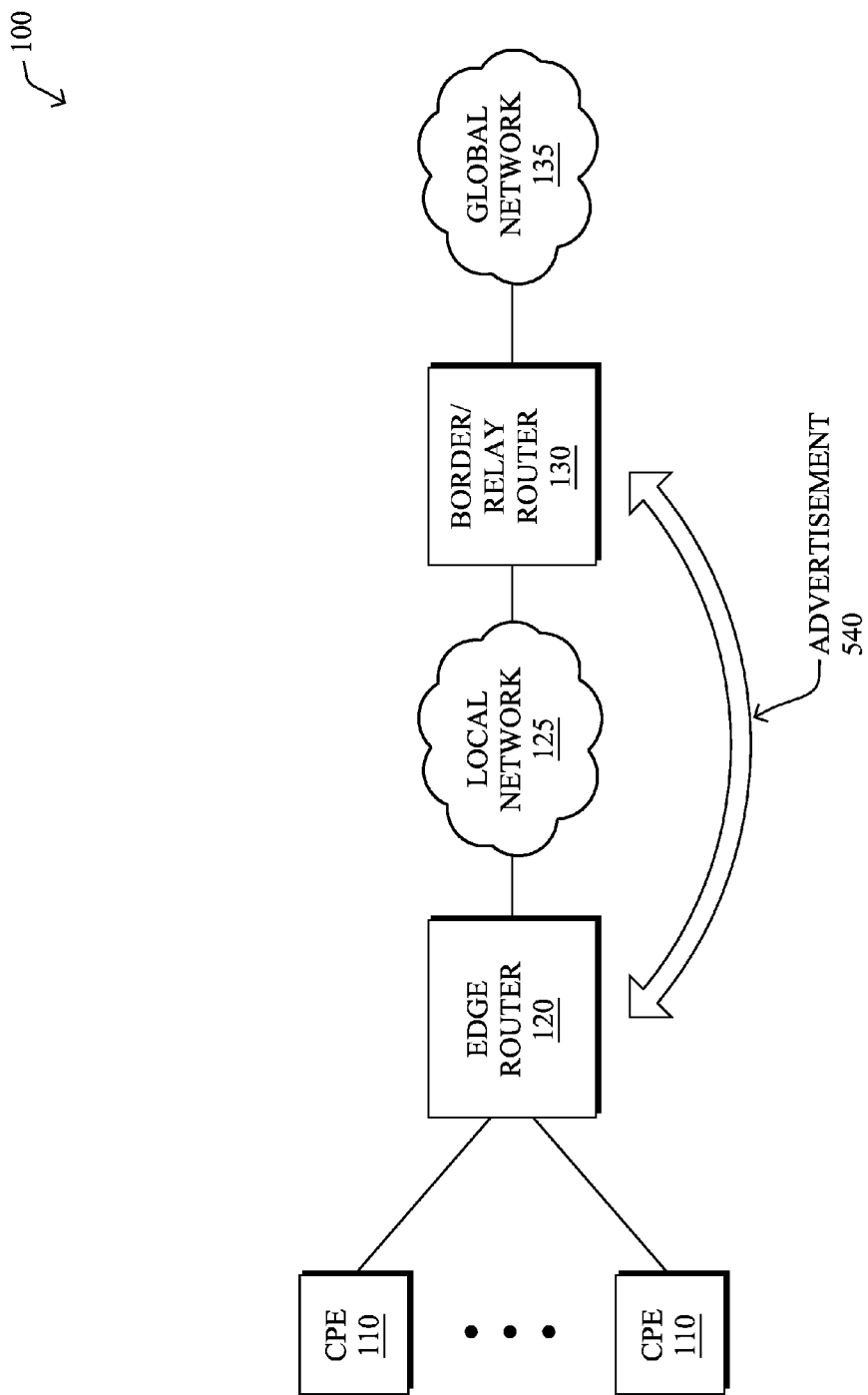
FIG. 5 illustrates an example advertisement.

FIG. 5 illustrates an example advertisement message 540 that may be propagated from the edge router 120 through the local computer network 125 to one or more border/relay routers 130. Generally, advertising utilizes whichever routing protocol is in place within the local network 125, such as IGP and/or BGP. In one embodiment, if BGP routing protocol is used, then the configuration information may be encoded in either new BGP communities (a BGP community field) or in a new BGP address family identifier and/or subsequent address family identifier (AFI/SAFI), the BGP fields for which may each be appreciated by those skilled in the art. When IGP is used for the advertisement 540, such as OSPF or ISIS, or the Enhanced Interior Gateway Routing Protocol (EIGRP), new fields may be defined or else populated by new information, such as a new type-length-value (TLV) in OSPF Router Information link state advertisements (LSAs), new sub-TLVs in ISIS Router Information, or new communities in EIGRP, etc.).

Notably, whether IGP or BGP used, the routing protocol advertisements 540 are prevented from leaking outside the local computer network 125 (e.g., the routing domain deemed internal to the ISP). Generally, IGP natively provides the interior routing domain, while BGP advertisements can be marked (with well-known communities) such that the advertisements do not leak beyond the local network 125 (e.g., IGP area/level or BGP autonomous system).

Once the border/relay router 130 receives such a routing advertisement 540, it can provision itself with the IPv6 transition option (e.g., 6rd, dIVI, 4rd, etc.), including any configuration on its pre-designated interface(s) 210 (e.g., parsed and applied accordingly).

In the event the configuration changes, such as when the network operators decide to change the configuration (e.g., an IPv4 sharing ratio in 4rd or dIVI), then it will be reflected in the IPv6 prefix/address assigned to the CPE in the client-server protocol messages 440, and subsequently snooped by the edge routers 120. According to the techniques herein, the edge routers 120 may then determine and advertise such changes in either the IPv6 transition option or associated configuration parameters, thereby enabling the border/relay routers 130 to learn about the change and update its configuration (i.e., provisioning itself with the changed IPv6 transition option and/or associated configuration parameters based on a newly received advertisement 540).

In the event the configuration is no longer in place (e.g., 6rd usage is removed by the operator at some point in the future), then the CPE will stop using those addresses, and the edge router 120 will eventually flush such entries from its local database, triggering the routing withdrawal of the corresponding information, which in turn would result in the border/relay router 130 deleting the configuration as well. In other words, in response to the edge router determining that the IPv6 transition option is no longer in place at the CPE device, whether through implicit entry flushing as noted or else in response to snooping client-server messages, the edge router may then withdraw the advertisement of the IPv6 transition option and associated configuration parameters from the one or more border/relay routers 130. In response, the one or more border/relay routers may then remove the provisioning for the withdrawn IPv6 transition option.

Figure 6:
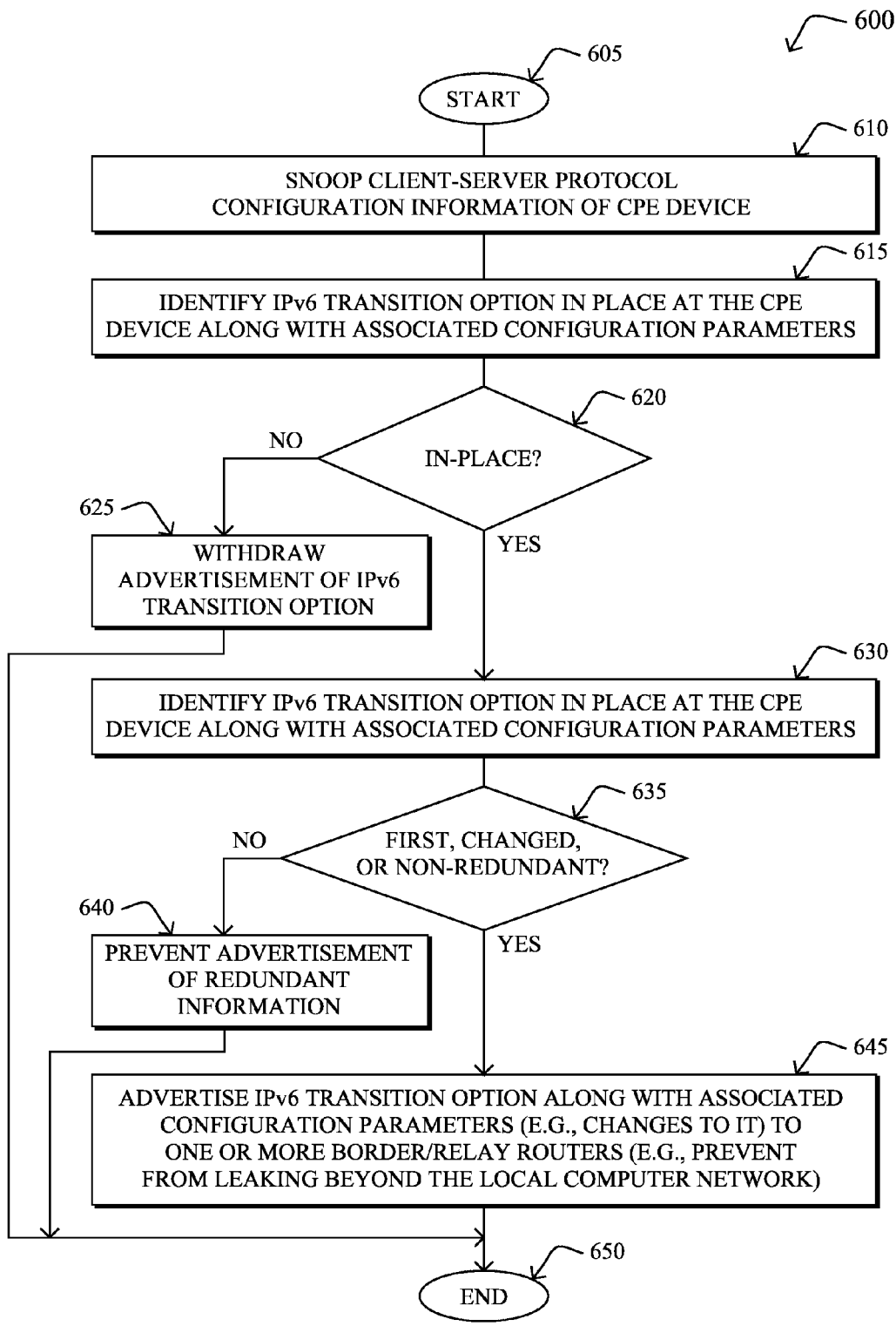
FIG. 6 illustrates an example simplified procedure for dynamic discovery of IPv6 transition parameters by border/relay routers, particularly from the perspective of an edge router.

FIG. 6 illustrates an example simplified procedure 600 for dynamic discovery of IPv6 transition parameters by border/relay routers in accordance with one or more embodiments described herein, particularly from the perspective of an edge router 120. The procedure 600 may start at step 605, and continues to step 610, where, as described in greater detail above, the edge router 120 snoops client-server protocol configuration information of a CPE device, such as through the edge router's role as a DHCP relay (e.g., messages 440). As such, in step 615, the edge router may identify an IPv6 transition option in place at the CPE device along with associated configuration parameters as described above, and if an IPv6 transition option is in-place (step 620), may store the IPv6 transition option along with associated configuration parameters.

After determining that the configuration information is a first instance or otherwise changed or non-redundant information in step 630, the edge router may then advertise the IPv6 transition option in step 635 along with the associated configuration parameters (e.g., changes to it) to one or more border/relay routers 130 in an advertisement 540 (while notably preventing it from leaking beyond the local computer network 125). If, on the other hand, the configuration information is redundant, in step 640 the edge route may correspondingly prevent advertisement of such redundant information. Note that in the event the identified IPv6 transition option in step 620 actually indicates that the transition option is no longer in place, then in step 645 the edge router may withdraw the advertisement of IPv6 transition option, accordingly. The procedure 600 illustratively ends in step 650, though notably with the ability to return to step 610 to continue snooping for further configuration information.

Figure 7:
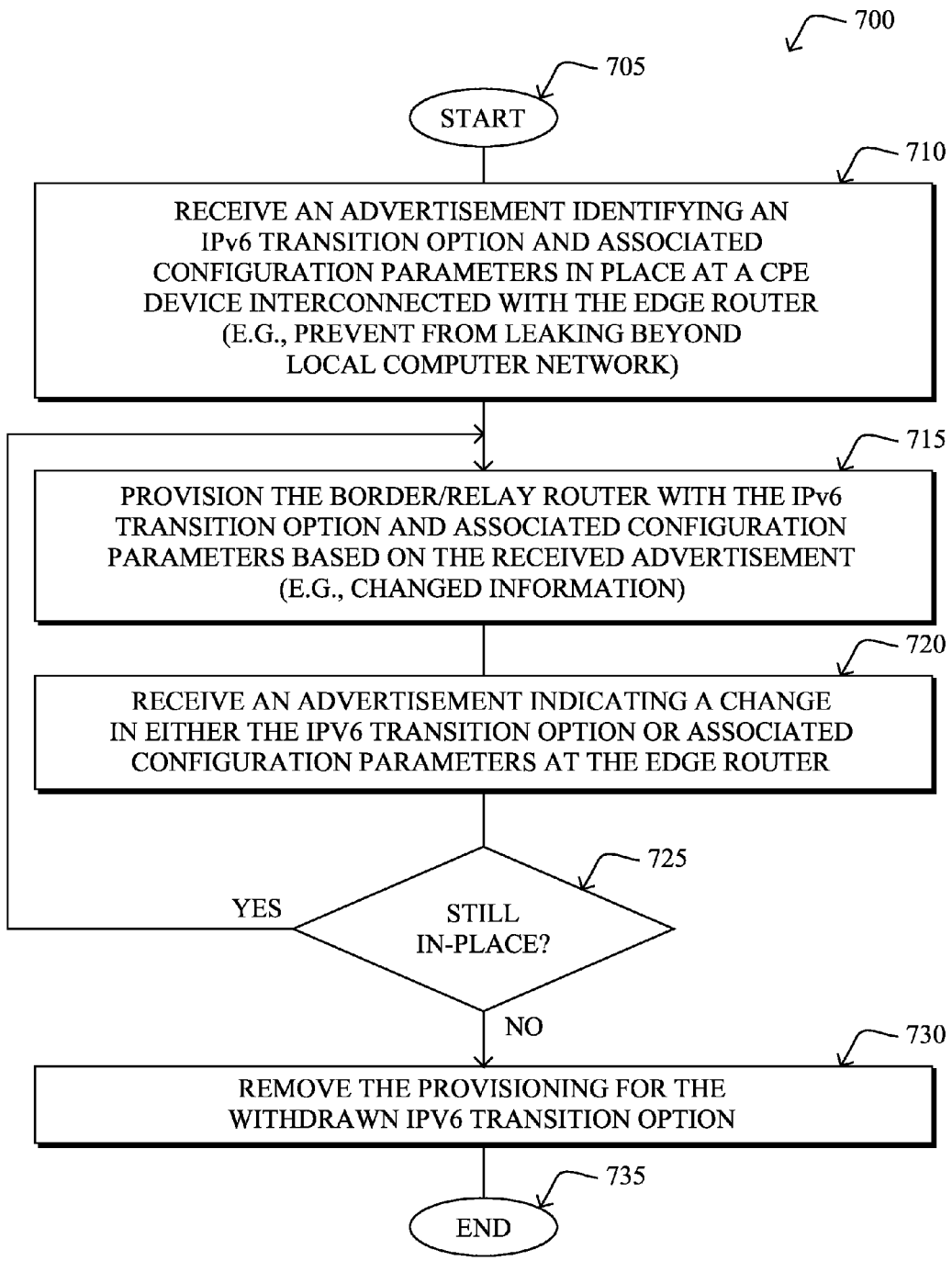
FIG. 7 illustrates an example simplified procedure for dynamic discovery of IPv6 transition parameters by border/relay routers, particularly from the perspective of a border/relay router.

Additionally, FIG. 7 illustrates an example simplified procedure 700 for dynamic discovery of IPv6 transition parameters by border/relay routers in accordance with one or more embodiments described herein, particularly from the perspective of a border/relay router 130. The procedure 700 may start at step 705, and continues to step 710, where, as described in greater detail above, a border/relay router 130 receives an advertisement 540 identifying an IPv6 transition option and associated configuration parameters in place at a CPE device interconnected with the edge router 120 from which the advertisement was received. Accordingly, as described above, the border/relay router may provision itself in step 715 with the IPv6 transition option and associated configuration parameters based on the received advertisement (e.g., changed information).

Subsequently, the border/relay router may receive another advertisement indicating a change in either the IPv6 transition option or associated configuration parameters in step 720. If the IPv6 transition option is still in place in step 725, then the procedure returns to step 715 to re-provision the border/relay router with the changed information. If, however, the option is not still in place (e.g., a withdrawal of the advertisement), then in step 730 the border/relay router may remove the provisioning for the withdrawn IPv6 transition option, and the procedure 700 ends in step 735.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for dynamic discovery of IPv6 transition parameters by border/relay routers in a communication network. In particular, the techniques herein provide operational simplification for ISPs as they transition to IPv6 and enable any of the corresponding IPv6 transition options. Specifically, the techniques herein may illustratively remove (or reduce) the need for having to configure one or more border/relay routers for the chosen IPv6 transition option, as well as the need for having to update the configuration when it changes (e.g., sharing ratio, IPv4-IPv6 address mapping, etc.). Moreover, the techniques herein leverage existing routing protocols that ISPs already execute on Edge and Border Routers.

While there have been shown and described illustrative embodiments that provide for dynamic discovery of IPv6 transition parameters by border/relay routers, it is to be understood that various other adaptations and modifications may be made within the spirit and scope of the embodiments herein. For example, the embodiments have been shown and described herein with relation to particular protocols. However, the embodiments in their broader sense are not as limited, and may, in fact, be used with other types of suitable protocols. In particular, while the techniques mention certain IPv6 transition protocols, other protocols having discoverable configuration parameters may also be used in accordance with the techniques herein. In addition, while DHCP servers are often not collocated with routers (e.g., with a routing process 244), and thus not configured to participate within a routing domain, the in-band techniques herein may be operational in the event such DHCP services are instantiated on a router.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

snooping, at an edge router of a local computer network, a dynamic host configuration protocol (DHCP) message used to provision client-server protocol configuration information of a customer-premises equipment (CPE) device;

identifying at the edge router, from the snooping, an Internet Protocol version 6 (IPv6) transition option in place at the CPE device along with associated configuration parameters for the IPv6 transition option that are identified in the DHCP message, wherein the IPv6 transition option is IPv6 Rapid Deployment (6rd), IPv4 Residual Deployment encapsulation (4rd-e), dual stateless IPv4/IPv6 translation (dIVI), lightweight address family transition for IPv6 (laft6), or 4rd translation (4rd-t);

determining, by the edge router, whether advertising the snooped IPv6 transition option and associated configuration parameters to one or more border or relay routers would be redundant with one or more IPv6 transition options and corresponding configurations already supported by the one or more border or relay routers;

advertising, by the edge router based on a determination that advertising the snooped IPv6 transition option and associated configuration parameters would not be redundant with one or more IPv6 transition options and corresponding configurations already supported by the one or more border or relay routers, the IPv6 transition option along with associated configuration parameters to the one or more border or relay routers of the local computer network to cause the one or more border or relay routers to automatically configure themselves to support the IPv6 transition option and associated configuration parameters upon receiving the advertised IPv6 transition option from the edge router, wherein the one or more border or relay routers link the local computer network to a global network; and preventing, by the edge router based on a determination that advertising the snooped IPv6 transition option and associated configuration parameters would be redundant with one or more IPv6 transition options and corresponding configurations already supported by the one or more border or relay routers, advertisement of the snooped IPv6 transition option and associated configuration parameters to the one or more border or relay routers.

2. The method as in claim 1, wherein advertising utilizes a routing protocol comprising an interior gateway protocol (IGP) or a border gateway protocol (BGP).

3. The method as in claim 2, wherein advertising utilizes BGP, and wherein the IPv6 transition option along with associated configuration parameters are coded within one of either a BGP community field or within a BGP address family identifier or subsequent address family identifier (AFI/SAFI).

4. The method as in claim 1, further comprising:
preventing the advertisement from leaking beyond the local computer network.

5. The method as in claim 1, further comprising:
storing the IPv6 transition option along with associated configuration parameters at the edge router.

6. The method as in claim 5, further comprising:
determining a change in either the IPv6 transition option or associated configuration parameters at the edge router; and
advertising the change to the one or more border or relay routers.

7. The method as in claim 1, further comprising:
determining, by the edge router, that the IPv6 transition option is no longer in place at the CPE device; and
withdrawing the advertisement of the IPv6 transition option and associated configuration parameters from the one or more border or relay routers to cause the one or more border or relay routers to remove the provisioning for the withdrawn IPv6 transition option.

8. The method as in claim 1, wherein the edge router is a DHCP relay.

9. A method, comprising:
receiving, at a border or relay router of a local computer network from an edge router of the local computer network, an advertisement identifying an Internet Protocol version 6 (IPv6) transition option and associated configuration parameters in place at a customer-premises equipment (CPE) device interconnected with the edge router and snooped from a dynamic host configuration protocol (DHCP) message by the edge router while acting as a DHCP relay, wherein the IPv6 transition option is IPv6 Rapid Deployment (6rd), IPv4 Residual Deployment encapsulation (4rd-e), dual stateless IPv4/IPv6 translation (dIVI), lightweight address family transition for IPv6 (laft6), or 4rd translation (4rd-t);
automatically provisioning the border or relay router with the IPv6 transition option and associated configuration parameters upon receiving the advertisement from the edge router, wherein the border or relay router links the local computer network to a global network;
provisioning the border or relay router with changed configuration parameters for the advertised IPv6 transition option, in response to receiving an indication from the edge router of the changed configuration parameters for the advertised IPv6 transition option; and
removing provisioning for the advertised IPv6 transition option, in response to receiving an indication from the edge router for withdrawal of the advertisement that identifies the IPv6 transition option.

10. The method as in claim 9, wherein advertising utilizes a routing protocol comprising an interior gateway protocol (IGP) or a border gateway protocol (BGP).

11. The method as in claim 10, wherein advertising utilizes BGP, and wherein the IPv6 transition option along with associated configuration parameters are coded within one of either a BGP community field or within a BGP address family identifier or subsequent address family identifier (AFI/SAFI).

12. The method as in claim 9, further comprising:
preventing the advertisement from leaking beyond the local computer network.

13. An apparatus, comprising:
one or more network interfaces to communicate as an edge router in a local computer network;
a processor coupled to the network interfaces and adapted to execute one or more processes; and
a memory configured to store a process executable by the processor, the process when executed operable to:
snoop a dynamic host configuration protocol (DHCP) message used to provision client-server protocol configuration information of a customer-premises equipment (CPE) device;
identify, from the snooping, an Internet Protocol version 6 (IPv6) transition option in place at the CPE device along with associated configuration parameters for the IPv6 transition option that are identified in the DHCP message, wherein the IPv6 transition option is IPv6 Rapid Deployment (6rd), IPv4 Residual Deployment encapsulation (4rd-e), dual stateless IPv4/IPv6 translation (dIVI), lightweight address family transition for IPv6 (laft6), or 4rd translation (4rd-t);
determine whether advertising the snooped IPv6 transition option and associated configuration parameters to one or more border or relay routers would be redundant with one or more IPv6 transition options and corresponding configurations already supported by the one or more border or relay routers;
advertise, based on a determination that advertising the snooped IPv6 transition option and associated configuration parameters would not be redundant with one or more IPv6 transition options and corresponding configurations already supported by the one or more border or relay routers, the IPv6 transition option along with associated configuration parameters to the one or more border or relay routers of the local computer network to cause the one or more border or relay routers to automatically configure themselves to support the IPv6 transition option and associated configuration parameters upon receiving the advertised IPv6 transition option from the edge router, wherein the one or more border or relay routers link the local computer network to a global network; and
prevent, based on a determination that advertising the snooped IPv6 transition option and associated configuration parameters would be redundant with one or more IPv6 transition options and corresponding configurations already supported by the one or more border or relay routers, advertisement of the snooped IPv6 transition option and associated configuration parameters to the one or more border or relay routers.

14. The apparatus as in claim 13, wherein the process when executed is further operable to:
store the IPv6 transition option along with associated configuration parameters.

15. The apparatus as in claim 14, wherein the process when executed is further operable to:
determine a change in either the IPv6 transition option or associated configuration parameters at the edge router; and
advertise the change to the one or more border or relay routers.

16. The apparatus as in claim 13, wherein the apparatus advertises the IPv6 transition option along with associated configuration parameters using a routing protocol comprising an interior gateway protocol (IGP) or a border gateway protocol (BGP).

17. The apparatus as in claim 13, wherein the apparatus uses BGP to advertise the IPv6 transition option along with associated configuration parameters, and wherein the IPv6 transition option along with associated configuration parameters are coded within one of either a BGP community field or within a BGP address family identifier or subsequent address family identifier (AFI/SAFI).

18. The apparatus as in claim 13, wherein the process when executed is further operable to:
determine that the IPv6 transition option is no longer in place at the CPE device; and
withdraw the advertisement of the IPv6 transition option and associated configuration parameters from the one or more border or relay routers to cause the one or more border or relay routers to remove the provisioning for the withdrawn IPv6 transition option.

19. An apparatus, comprising:
one or more network interfaces to communicate as a border or relay router in a local computer network;
a processor coupled to the network interfaces and adapted to execute one or more processes; and
a memory configured to store a process executable by the processor, the process when executed operable to:
receive, from an edge router of the local computer network, an advertisement identifying an Internet Protocol version 6 (IPv6) transition option and associated configuration parameters in place at a customer-premises equipment (CPE) device interconnected with the edge router and snooped from a dynamic host configuration protocol (DHCP) message by the edge router while acting as a DHCP relay, wherein the IPv6 transition option is IPv6 Rapid Deployment (6rd), IPv4 Residual Deployment encapsulation (4rd-e), dual stateless IPv4/IPv6 translation (dIVI), lightweight address family transition for IPv6 (laft6), or 4rd translation (4rd-t);
automatically provision the border or relay router with the IPv6 transition option and associated configuration parameters upon receiving the advertisement from the edge router, wherein the border or relay router links the local computer network to a global network;
provision the border or relay router with changed configuration parameters for the advertised IPv6 transition option, in response to receiving an indication from the edge router of the changed configuration parameters for the advertised IPv6 transition option; and
remove provisioning for the advertised IPv6 transition option, in response to receiving an indication from the edge router for withdrawal of the advertisement that identifies the IPv6 transition option.

20. The apparatus as in claim 19, wherein the advertisement utilizes a routing protocol comprising an interior gateway protocol (IGP) or a border gateway protocol (BGP).

* * * * *